3,018,228
EXTRACTIVE DISTILLATION PROCESS
David Cornell, Dayton, Ohio, assignor to Monsanto Chemical Company, St. Louis, Mo., a corporation of Delaware
No Drawing. Filed Aug. 4, 1958, Ser. No. 753,147
5 Claims. (Cl. 202—39.5)

The present invention relates generally to the separation, concentration, and/or purification of styrene and is particularly concerned with the separation of styrene from ethylbenzene.

In the production of monomeric styrene, a dehydrogenation process is employed in which ethylbenzene is the starting material. The process therefore results in the production of a mixture of styrene and ethylbenzene from which mixture the styrene must be recovered. Conventional distillation methods are poorly adapted to the separation and recovery of styrene from ethylbenzene because of the small difference in the boiling points of the respective compounds. It has also been found that azeotropic distillation, in which azeotroping agents are added to reduce the boiling point of components to be separated from the styrene, is impractical because of separation difficulties between such agents and the compounds with which the azeotrope has been formed. Solvent extraction methods have also been found to be impractical in the present separation. For example, the use of diethyl glycol as a selective solvent in a liquid-liquid extraction process has been found to require an excessive number of stages for production of pure styrene. The result is that the apparatus must be of unusually large size, with a resultant high capitalization cost for the separation process.

It has now been found that the separation of styrene from ethylbenzene may readily be accomplished by means of an extractive distillation process in which the ethylbenzene is separated as an overhead product, while the styrene is obtained as a bottoms product by the use of ethylene carbonate as the extractive distillation solvent. It has been found that ethylene carbonate exhibits a unique effect in the separation of ethylbenzene and styrene, whereby the relative volatility of the components of the system, as described below, are obtained in the range of from 1.6 to 2.3, assuring an enhanced separation between the respective components. In this connection, it may be stated that the relative volatility of these components, in the absence of ethylene carbonate, is on the order of 1.4.

It has been found that the present method is efficacious with starting mixtures of ethylbenzene and styrene in all proportions, so that it is possible to obtain each of the components in pure form regardless of the proportions in which they are present in the crude starting material. The proportion of the ethylene carbonate employed in the present invention varies over the range of 0.5 to 8 moles of ethylene carbonate per mole of hydrocarbon mixture, a preferred range being from 0.8 to 5. The process may be operated over a wide range of temperatures, such as from 150° F. to 210° F. corresponding in general to pressures of from 20 to 250 mm. Hg absolute. The temperature and pressure ranges contemplated herein are applicable to the operating condition at any point in the extractive distillation column. The upper temperature is limited by the tendency of the styrene to polymerize and not by any inherent limitation of the present extractive distillation process. It is obvious that such a distillation process may be conducted with any conventional distillation column of the bubble-plate, packed, or sieve-plate type as may be desired. The selection of the best reflux ratio, size and number of plates and other details of column design necessary in order to obtain the desired degree of purity will be obvious to one skilled in the art having the benefit of the present disclosure. If necessary, to prevent or minimize the polymerization of styrene, conventional polymerization inhibitors may also be used.

The apparatus employed constitutes a conventional extractive distillation column in which the crude mixture of ethylbenzene and styrene is charged to the middle region of a column with reflux being returned near the top of the column, while the overhead vapor fraction is withdrawn as an ethylbenzene enriched stream. The ethylene carbonate solvent from any source is introduced into the column at a plate located several plates below the top of the column. The bottoms stream leaving the column contains the styrene, together with the ethylene carbonate. The mixture of styrene and ethylene carbonate in the bottoms fraction is then separated into its components by conventional separation means, which may comprise the use of water washing, distillation, or freezing, by which means one may obtain the styrene in the desired pure state. For example, one may employ a conventional fractionation column, wherein by simple fractional distillation the styrene is recovered as the overhead fraction in pure form. In another type of column the styrene in admixture with the ethylene carbonate is fed into the middle region of a column, while steam or another heated inert gas is fed to the bottom of the column. The overhead product from such stripping operation is the pure styrene, while the ethylene carbonate is obtained as the bottoms product which is then dried and recycled to the main distillation column, as described above.

It has been found that ethylene carbonate is particularly advantageous in the present process, since this material is stable against decomposition and is non-reactive with respect to the styrene, ethylbenzene as well as any impurities which are conventionally found in such crude mixtures. It is also an advantage that ethylene carbonate is non-toxic and is a relatively inexpensive material. The use of ethylene carbonate as herein disclosed makes it possible to separate styrene and ethylbenzene in a considerably smaller column. The unique action of ethylene carbonate is shown by the failure of propylene carbonate to function as an extractive distillation solvent for the present mixture of styrene with ethylbenzene, since propylene carbonate has a far lesser degree of selectivity in the present system.

The comparative selectivity of an extractive distillation solvent is best determined by its specific efficiency with respect to the styrene and ethylbenzene which are to be separated in the present method. This efficiency may be expressed as the relative volatility of the ethylbenzene relative to the styrene in the presence of ethylene carbonate. The equation which expresses this relative volatility is:

$$\alpha = \frac{(\gamma P_V) \text{ ethylbenzene}}{(\gamma P_V) \text{ styrene}}$$

where $\gamma$ represents the activity coefficients defined by the following equation:

$$1 = \frac{Y_1 P_T}{X_1 P_{V_1}}$$

In the above equation $X_1$ and $Y_1$ represent the mole fractions of a given component in the liquid and vapor phases, respectively, while $P_{V_1}$ and $P_T$ represent the vapor pressure of the given component, and the total pressure of the system respectively. It has been found that the relative volatility values thus obtained for the system of ethylbenzene and styrene in the presence of ethylene carbonate as the extractive distillation solvent vary from about 1.6 to 2.3 within the solvent ratio range of from 0.5 to 8 moles of solvent per mole of total hydrocarbon, and over a temperature range of from about 150° F. to 210° F.

The following example illustrates a specific embodiment of the present invention.

The activity coefficients for a number of styrene-ethylbenzene mixtures were obtained by vapor-liquid equilibrium measurements carried out in a Colburn still. The liquid temperature was measured. The pressure in the still was controlled by means of a manostat connected to an aspirator, while the analyses of the vapor fraction and the liquid fraction were carried out by gas chromatography. The use of a 50% ethylbenzene–50% styrene mixture at two solvent ratio levels gave the following values for relative volatility:

| Test | Relative Volatility | Moles Ethylene Carbonate/ Moles Total Hydrocarbon | Temperature, °F. |
|---|---|---|---|
| 1 | 1.89 | 2 | 150 |
| 2 | 1.83 | 2 | 200 |
| 3 | 2.25 | 8 | 150 |
| 4 | 2.16 | 8 | 200 |

The advantage gained by the use of ethylene carbonate in the separation of ethylbenzene and styrene can be seen from the following table:

| Solvent Ratio (Moles Ethylene Carbonate/Mole Styrene + Ethylbenzene) | Number of Actual Plates in Distillation Column Required for Standard Separation |
|---|---|
| 0 (conventional distillation) | 77 |
| 0.5 | 74 |
| 1.0 | 63 |
| 2.0 | 53 |
| 5.0 | 45 |
| 8.0 | 42 |

The standard separation is based on 99.5% (mole) ethylbenzene in the overhead product and 99.8% (mole) styrene in the bottoms product on a solvent-free basis. The feed is 60% (mole) styrene and 40% (mole) ethylbenzene. A reflux ratio of 10/1 was used in all cases. A saturated liquid feed (i.e. at the boiling point) was used for conventional distillation (solvent ratio=0), and a saturated vapor feed (at the dew point) was used for all of the extractive distillation cases (solvent ratio≠0). A plate efficiency of 75% was taken for the conventional distillation calculations, since this efficiency is an approximate average for such separations. A plate efficiency of 50% was used for the extractive distillation calculations, since commercial extractive distillations range at about this average value. Five actual plates were added to the calculated number of plates in the extractive distillation cases to allow for removal of ethylene carbonate from the overhead product.

The above calculations indicate that the ethylene carbonate make it possible to produce high purity styrene from a crude mixture of styrene with ethylbenzene by means of a process in which the ethylbenzene is separated as an overhead vapor fraction.

Obviously many modifications and variations of the invention as hereinbefore set forth may be made without departing from the spirit and scope thereof, and therefore only such limitations should be imposed as are indicated in the appended claims.

What is claimed is:

1. The method of separating styrene and ethylbenzene from a crude hydrocarbon fraction containing the same which comprises subjecting such crude mixture to extractive distillation in the presence of ethylene carbonate, withdrawing a vapor fraction comprising ethylbenzene, and a liquid fraction comprising the said ethylene carbonate containing styrene, and stripping the styrene from the said ethylene carbonate.

2. The method of claim 1 in which the proportion of ethylene carbonate on a molar proportion relative to the moles of crude hydrocarbon is from 0.5 to 8.

3. The method of claim 1 in which the proportion of ethylene carbonate on a molar proportion relative to the moles of crude hydrocarbon is from 0.8 to 5.

4. The method of claim 1 in which the proportion of ethylene carbonate on a molar proportion relative to the moles of crude hydrocarbon is from 0.5 to 8, and in which the pot temperature of distillation is maintained in the range of from 150° F. to 210° F.

5. The method of claim 1 in which the proportion of ethylene carbonate on a molar proportion relative to the moles of crude hydrocarbon is from 0.8 to 5, and in which the pot temperature of distillation is maintained in the range of from 150° F. to 210° F.

References Cited in the file of this patent

UNITED STATES PATENTS 2,688,645     Badertscher et al.     Sept. 7, 1954
2,837,585     Murray et al.     June 3, 1958

OTHER REFERENCES

Hibshman: "Industrial Engineering Chemistry" (1949), vol. 41, pp. 1366–1374.

Progress in Petroleum Technology, 1951 (Advances in Chemistry Series #5), pp. 205–209.

Garner: "The Industrial Chemist" (1949), pp. 238–242.

"Technique of Organic Chemistry-Distillation," vol. IV, 1951, New York, Weissberger, p. 338.